United States Patent
Hsieh et al.

(10) Patent No.: US 9,846,491 B2
(45) Date of Patent: Dec. 19, 2017

(54) OPTICAL OBJECT POSITIONING APPARATUS AND POSITIONING METHOD THEREOF

(71) Applicants: Chi-Tang Hsieh, Hsin-Chu (TW); Yu-Jie Su, Hsin-Chu (TW); Yu-Cheng Chang, Hsin-Chu (TW); Zong Qin, Hsin-Chu (TW); Yi-Pai Huang, Hsin-Chu (TW)

(72) Inventors: Chi-Tang Hsieh, Hsin-Chu (TW); Yu-Jie Su, Hsin-Chu (TW); Yu-Cheng Chang, Hsin-Chu (TW); Zong Qin, Hsin-Chu (TW); Yi-Pai Huang, Hsin-Chu (TW)

(73) Assignees: Coretronic Corporation, Hsin-Chu (TW); National Chiao Tung University, Hsinchu (TW)

( * ) Notice: Subject to any disclaimer, the term of this patent is extended or adjusted under 35 U.S.C. 154(b) by 182 days.

(21) Appl. No.: 14/831,885

(22) Filed: Aug. 21, 2015

(65) Prior Publication Data
US 2016/0224190 A1 Aug. 4, 2016

(30) Foreign Application Priority Data
Jan. 30, 2015 (TW) .............................. 104103198 A

(51) Int. Cl.
*G06F 3/03* (2006.01)
*G06F 3/042* (2006.01)
*G06F 3/0346* (2013.01)

(52) U.S. Cl.
CPC .......... *G06F 3/0304* (2013.01); *G06F 3/0346* (2013.01); *G06F 3/0425* (2013.01)

(58) Field of Classification Search
None
See application file for complete search history.

(56) References Cited

U.S. PATENT DOCUMENTS 5,429,128 A 7/1995 Cadell et al.
6,313,825 B1 11/2001 Gilbert
(Continued)

FOREIGN PATENT DOCUMENTS

| CN | 102736140 | 10/2014 |
|---|---|---|
| CN | 102096525 | 12/2014 |
| TW | 1451344 | 9/2014 |

OTHER PUBLICATIONS

"Office Action of Taiwan Counterpart Application", dated Jul. 5, 2016, p. 1-p. 8.

*Primary Examiner* — Amare Mengistu
*Assistant Examiner* — Shawna Stepp Jones
(74) *Attorney, Agent, or Firm* — JCIPRNET

(57) ABSTRACT

An optical object positioning apparatus including an optical element, a light sensor and a processing unit and a positioning method thereof are provided. The optical element includes a first surface and a second surface opposite to each other and perpendicular to a first axis, and has at least two light-passing regions. Light beams from an object to be positioned pass through the light-passing regions from the first surface to the second surface. The light sensor and the optical element are spaced by a predetermined distance on a direction of the first axis. The light sensor senses the light beams from the light-passing regions to generate at least two light-sensing signals. A distance between the object and the optical element is positively correlated to the predetermined distance. The processing unit receives the light-sensing signals and positions the object according to the light-sensing signals and the predetermined distance.

16 Claims, 6 Drawing Sheets

(56) References Cited

U.S. PATENT DOCUMENTS

| | | |
|---|---|---|
| 6,611,252 B1 | 8/2003 | DuFaux |
| 8,542,350 B2 | 9/2013 | Nakanishi |
| 2008/0088731 A1 | 4/2008 | Tanaka |
| 2009/0027335 A1* | 1/2009 | Ye .................... G06F 3/017 |
| | | 345/158 |
| 2012/0229384 A1* | 9/2012 | Nakane ............ G06F 3/03545 |
| | | 345/158 |
| 2014/0264702 A1* | 9/2014 | Souchkov ......... H01L 27/1446 |
| | | 257/435 |

* cited by examiner

OPTICAL OBJECT POSITIONING APPARATUS AND POSITIONING METHOD THEREOF

CROSS-REFERENCE TO RELATED APPLICATION

This application claims the priority benefit of Taiwan application serial no. 104103198, filed on Jan. 30, 2015. The entirety of the above-mentioned patent application is hereby incorporated by reference herein and made a part of this specification.

BACKGROUND

Technical Field

The invention relates to a positioning technique for a touch operation, and particularly relates to an optical object positioning apparatus and a positioning method thereof.

Related Art

A current technique for positioning a touch point of a touch operation generally requires using a complicated image processing technique and algorithm to identify a position of the touch point on an image, or using an emitter to emit a signal and a receiver correspondingly to receive the signal to calculate the position of the touch point.

Patents or patent application publications related to an optical positioning technique may include U.S. Patent Application Publication No. 20080088731, U.S. Patent Application Publication No. 20140264702, U.S. Pat. No. 5,429,128, U.S. Pat. No. 6,313,825, and U.S. Pat. No. 6,611,252. However, devices used in the techniques of the aforementioned patents or publications are expensive and have a large volume, and high-end processors are required for image processing thereof. Meanwhile, it is hard to achieve an effect of accurate control by using the emitter to emit signals.

The information disclosed in this "BACKGROUND" section is only for enhancement understanding of the background of the invention and therefore it may contain information that does not form the prior art that is already known to a person of ordinary skill in the art. Furthermore, the information disclosed in this "BACKGROUND" section does not mean that one or more problems to be solved by one or more embodiments of the invention were acknowledged by a person of ordinary skill in the art.

SUMMARY

The invention is directed to an optical object positioning apparatus and an optical object positioning method, by which an optical element having light-passing regions is used to produce light sensing signals (information) on a light sensor, so as to calculate a position of the object.

Other objects and advantages of the invention can be further illustrated by the technical features broadly embodied and described as follows.

In order to achieve one or a portion of or all of the objects or other objects, an embodiment of the invention provides an optical object positioning apparatus including an optical element, a light sensor, and a processing unit. The optical element includes a first surface and a second surface opposite to each other and perpendicular to a first axis, and has at least two light-passing regions. The at least two light-passing regions are capable of letting light beams coming from an object to be positioned pass through the light-passing regions from the first surface to the second surface. The light sensor and the optical element are spaced by a predetermined distance on a direction of the first axis. The light sensor is configured to sense the light beams coming from the light-passing regions to correspondingly generate at least two light-sensing signals. The distance between the object to be positioned and the optical element on the direction of the first axis is positively correlated to the predetermined distance. The processing unit is coupled to the light sensor, and is configured to receive the light-sensing signals and position the object to be positioned according to the light-sensing signals and the predetermined distance.

In an embodiment of the invention, the processing unit is configured to calculate two-dimensional coordinates of the object to be positioned in a two-dimensional space according to the light-sensing signals and the predetermined distance. A coordinate value of the two-dimensional coordinates on the direction of the first axis is correlated to the predetermined distance and a distance between any two of the light-passing regions. A coordinate value of the two-dimensional coordinates on a direction of a second axis is correlated to the coordinate value on the direction of the first axis, where the second axis is perpendicular to the first axis.

In an embodiment of the invention, the processing unit is configured to calculate three-dimensional coordinates of the object to be positioned in a three-dimensional space according to the light-sensing signals and the predetermined distance. A coordinate value of the three-dimensional coordinates on the direction of the first axis is correlated to the predetermined distance and a distance between any two of the light-passing regions. A coordinate value of the three-dimensional coordinates on a direction of a second axis is correlated to the coordinate value on the direction of the first axis. A coordinate value of the three-dimensional coordinates on a direction of a third axis is correlated to the coordinate value on the direction of the first axis, where the first axis, the second axis, and the third axis are perpendicular to each other. The light-passing regions are located on a plane formed by the second axis and the third axis.

In an embodiment of the invention, when a coordinate value of the first surface of the optical element on the first axis is 0, a coordinate value of the object to be positioned on the first axis satisfies:

$$X_0 = \frac{g \times |y_{m1} - y_{m2}|}{|y_{s1} - y_{s2}| - |y_{m1} - y_{m2}|},$$

where $X_0$ is the coordinate value of the object to be positioned on the first axis, $g$ is the predetermined distance, $y_{m1}$ and $y_{m2}$ are respectively coordinate values of any two of the light-passing regions on a second axis, $y_{s1}$ and $y_{s2}$ are respectively coordinate information of the light-sensing signals corresponding to the any two of the light-passing regions that is related to the second axis, and the second axis is perpendicular to the first axis.

In an embodiment of the invention, a coordinate value of the object to be positioned on the second axis satisfies:

$$Y_0 = \frac{y_{mi} - y_{si}}{g} \times X_0 + y_{mi},$$

where $Y_0$ is the coordinate value of the object to be positioned on the second axis, and $i$ is 1 or 2.

In an embodiment of the invention, a coordinate value of the object to be positioned on a third axis satisfies:

$$Z_0 = \frac{z_{mi} - z_{si}}{g} \times X_0 + z_{mi},$$

where $Z_0$ is the coordinate value of the object to be positioned on the third axis, $z_{mi}$ is a coordinate value of one of the light-passing regions on the third axis, $z_{si}$ is coordinate information of one of the light-sensing signals corresponding to the one of the light-passing regions related to the third axis, i is 1 or 2, and the third axis is perpendicular to the first axis and the second axis.

In an embodiment of the invention, the optical element includes a slit array element having at least two slits, a hole-like array element having at least two holes, or a lens array element having at least two lenses.

In an embodiment of the invention, the optical element includes the lens array element having at least two lenses, and the lens includes at least one of an aspherical lens, a spherical lens, and a zoom lens.

In an embodiment of the invention, the optical element further includes at least one mark element. A position of the mark element is different to positions of the light-passing regions.

In an embodiment of the invention, the mark element is configured to shield light or has a light-passing pattern different to light-passing patterns of the light-passing regions.

In an embodiment of the invention, the optical object positioning apparatus further includes a light source. The light source is configured to project light to the object to be positioned.

In an embodiment of the invention, the processing unit is configured to receive the light-sensing signals and position the object to be positioned according to the predetermined distance, coordinates of any two of the light-passing regions, and coordinates of two sensing regions on the light sensor respectively corresponding to the any two of the light-passing regions, and wherein the at least two light-sensing signals are respectively corresponding to the two sensing regions and the two sensing regions are positions of the at least two light beams reaching the light sensor after the at least two light beams pass through the any two of the light-passing regions.

In order to achieve one or a portion of or all of the objects or other objects, an embodiment of the invention provides an optical object positioning method, which includes following steps. Light beams passing through at least two light-passing regions of an optical element are sensed by using a light sensor, so as to correspondingly generate at least two light-sensing signals, where the light beams coming from an object to be positioned pass through the optical element from a first surface to a second surface through the light-passing regions. The first surface and the second surface located at two opposite sides of the optical element are perpendicular to a first axis, and the light sensor and the optical element are spaced by a predetermined distance. A processing unit is used to position the object to be positioned according to the light-sensing signals and the predetermined distance, where the distance between the object to be positioned and the optical element is positively correlated to the predetermined distance.

In an embodiment of the invention, the step of positioning the object to be positioned further includes following steps. Two-dimensional coordinates of the object to be positioned in a two-dimensional space are calculated according to the light-sensing signals and the predetermined distance, where a coordinate value of the two-dimensional coordinates on a direction of the first axis is correlated to the predetermined distance and a distance between any two of the light-passing regions, a coordinate value of the two-dimensional coordinates on a direction of a second axis is correlated to the coordinate value on the direction of the first axis, where the second axis is perpendicular to the first axis.

In an embodiment of the invention, the step of positioning the object to be positioned further includes following steps. Three-dimensional coordinates of the object to be positioned in a three-dimensional space are calculated according to the light-sensing signals and the predetermined distance, where a coordinate value of the three-dimensional coordinates on the direction of the first axis is correlated to the predetermined distance and a distance between any two of the light-passing regions, a coordinate value of the three-dimensional coordinates on a direction of a second axis is correlated to the coordinate value on the direction of the first axis, and a coordinate value of the three-dimensional coordinates on a direction of a third axis is correlated to the coordinate value on the direction of the first axis, where the first axis, the second axis, and the third axis are perpendicular to each other, and the light-passing regions are located on a plane formed by the second axis and the third axis.

In an embodiment of the invention, when a coordinate value of the first surface of the optical element on the first axis is 0, a coordinate value of the object to be positioned on the first axis satisfies:

$$X_0 = \frac{g \times |y_{m1} - y_{m2}|}{|y_{s1} - y_{s2}| - |y_{m1} - y_{m2}|},$$

where $X_0$ is the coordinate value of the object to be positioned on the first axis, g is the predetermined distance, $y_{m1}$ and $y_{m2}$ are respectively coordinate values of any two of the light-passing regions on a second axis, $y_{s1}$ and $y_{s2}$ are respectively coordinate information of the light-sensing signals corresponding to the any two of the light-passing regions that is related to the second axis, and the second axis is perpendicular to the first axis.

In an embodiment of the invention, a coordinate value of the object to be positioned on the second axis satisfies:

$$Y_0 = \frac{y_{mi} - y_{si}}{g} \times X_0 + y_{mi},$$

where $Y_0$ is the coordinate value of the object to be positioned on the second axis, and i is 1 or 2.

In an embodiment of the invention, a coordinate value of the object to be positioned on a third axis satisfies:

$$Z_0 = \frac{z_{mi} - z_{si}}{g} \times X_0 + z_{mi},$$

where $Z_0$ is the coordinate value of the object to be positioned on the third axis, $z_{mi}$ is a coordinate value of one of the light-passing regions on the third axis, $z_{si}$ is coordinate information of one of the light-sensing signals corresponding to the one of the light-passing regions that is related to the third axis, i is 1 or 2, and the third axis is perpendicular to the first axis and the second axis.

In the embodiments of the optical object positioning apparatus and the optical object positioning method of the invention, equations are obtained by using at least two light-passing regions of the optical element, the two corresponding light-sensing signals (information) generated by the light sensor and the distance (the predetermined distance) between the light sensor and the optical element to calculate coordinates of an object (operation point) on an operation region in a two-dimensional or three-dimensional space to position the object. Since calculation of the equation does not have a complicated operation process, and can be used to accurately calculate the positioning point, speed and accuracy of positioning are enhanced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
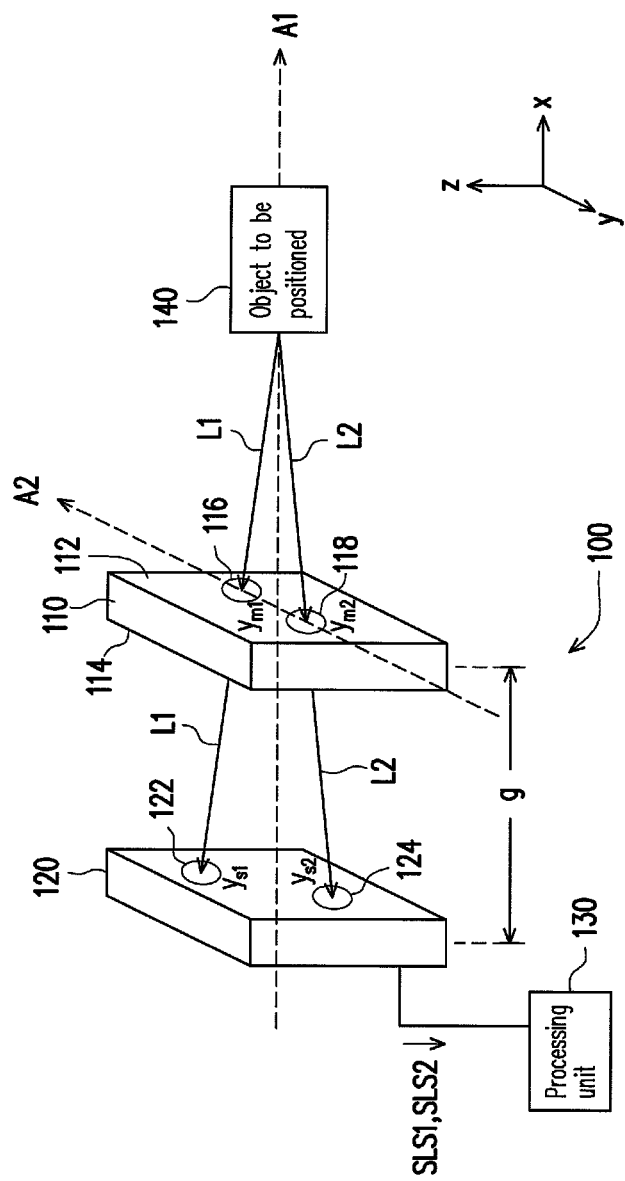
FIG. 1A is a block schematic diagram of an optical object positioning apparatus according to an embodiment of the invention.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

In order to position an object (a fingertip, a stylus, or a mouse) via an optical sensing manner, an embodiment of the invention provides an optical object positioning apparatus, in which by using an optical element having light-passing regions, light beams coming from an object to be positioned pass through the optical element to reach a light sensor, and related coordinates of the light-passing regions and related coordinates of light positions (sensing regions) on the light sensor are input to an equation to calculate two-dimensional (2D) or three-dimensional (3D) coordinates of the object to be positioned. In this way, the object on the operation region can be accurately positioned without using an expensive image capturing unit (a camera) or performing a complicated image processing computation.

FIG. 1A is a block schematic diagram of an optical object positioning apparatus according to an embodiment of the invention. Referring to FIG. 1A, in the present embodiment, the optical object positioning apparatus 100 includes an optical element 110, a light sensor 120, and a processing unit 130. The optical element 100 of the present embodiment has at least two light-passing regions (which mean that light can pass through the regions and will be described later). For example, the optical element 100 is a hole-like array element having at least two holes serving as the light-passing regions. As shown in FIG. 1A, the optical element 110 includes a first surface 112 and a second surface 114 opposite to each other and perpendicular to a first axis A1, and has at least two light-passing regions (for example, light-passing regions 116 and 118). In the present embodiment, light beams coming from an object to be positioned 140 pass through the light-passing regions (for example, the light-passing regions 116 and 118) from the first surface 112 to the second surface 114, and the first surface 112 is located between the object to be positioned 140 and the second surface 114. A light beam L1 and a light beam L2 coming from the object to be positioned 140 (for example, a fingertip, a stylus, or a mouse) respectively passes through the light-passing region 116 and the light-passing region 118 from the first surface 112 to the second surface 114.

The light sensor 120 of the present embodiment is, for example, a photo-sensing element capable of producing a photocurrent after being irradiated by light, such as a charge coupled device (CCD), a complementary metal-oxide-semiconductor (CMOS), a photodiode, a photoresistor, a phototransistor, etc., though the invention is not limited thereto, and any photo-sensing element capable of producing sensing signals through the photo-sensing manner is considered to be within the scope of the invention. As shown in FIG. 1A, the light sensor 120 and the optical element 110 are spaced by a predetermined distance g on a direction of the first axis A1. The light sensor 120 senses the light beams coming from at least two light-passing regions to correspondingly generate at least two light-sensing signals (which are described later). By sensing positions (for example, sensing regions 122 and 124) of the light beams L1 and L2 coming from the light-passing region 116 and the light-passing region 118 respectively on the light sensor 120, the light sensor 120 can correspondingly generate two light-sensing signals (for example, light-sensing signals SLS1 and SLS2). In the present embodiment, the light beams L1 and L2 are, for example, formed by the object to be positioned 140 by reflecting light of a light source, or can be emitted by the object to be positioned 140 (which is, for example, a self-luminous body), which is not limited by the invention.

The processing unit 130 is, for example, a central processing unit (CPU), a micro processor, a controller, a microcontroller unit, a digital signal process (DSP), a programmable controller, an application specific integrated circuit (ASIC), a programmable logic device (PLD), processing software or control software, though the invention is not limited to the aforementioned hardware or software. The processing unit 130 is coupled to the light sensor 120. The processing unit 130 can receive the light-sensing signal SLS1 and the light-sensing signal SLS2, and position the object to be positioned 140 according to the light-sensing signal SLS1, the light-sensing signal SLS2, and the predetermined distance g.

In the present embodiment, although the light sensor 120 and the processing unit 130 implemented by independent devices are taken as an example for description, the invention is not limited thereto. In other embodiments, the light sensor 120 and the processing unit 130 can be implemented by a single electronic device, for example, the processing unit 130 may be integrated in the light sensor 120.

In the present embodiment, a distance between the object to be positioned 140 and the optical element 110 is positively correlated to a distance between the light sensor 120 and the optical element 110 (i.e. the predetermined distance g), which can be represented by a simple equation, so that computation complexity of the image processing of the present embodiment can be simplified. A positioning method of the optical object positioning apparatus 100 of the present embodiment for the object to be positioned 140 is described below.

In the present embodiment, when the number of the light-passing regions is two (for example, the light-passing region 116 and the light-passing region 118), the processing unit 130 can calculate coordinates of the object to be positioned 140 in the space according to the positions of the sensing region 122 and the sensing region 124 indicated by the light-sensing signal SLS1 and the light-sensing signal SLS2 respectively and the predetermined distance g. As shown in FIG. 1A, it is assumed that the light-passing region 116 and the light-passing region 118 are located on a plane perpendicular to the first axis A1, and it is assumed that a coordinate value of the first surface 112 of the optical element 110 on the first axis A1 is 0. A coordinate value of the object to be positioned 140 on the first axis A1 (which represents an x-axis of the coordinate system) satisfies the following equation:

$$X_0 = \frac{g \times |y_{m1} - y_{m2}|}{|y_{s1} - y_{s2}| - |y_{m1} - y_{m2}|} \quad \text{equation (1)}$$

Referring to the above equation (1) and FIG. 1A, when the coordinate value of the first surface 112 on the first axis A1 is 0, the coordinate value of the object to be positioned 140 on the first axis A1 is $X_0$. $y_{m1}$ and $y_{m2}$ are respectively coordinates of the light-passing region 116 and the light-passing region 118 on a second axis A2 (which represents a y-axis of the coordinate system), ys1 and ys2 are respectively coordinates of the sensing region 122 and the sensing region 124 corresponding to the light-sensing signal SLS1 and light-sensing signal SLS2 respectively on a direction of the second axis A2 (i.e. coordinate information of the light-sensing signals SLS1 and SLS2 related to the second axis A2), where the sensing region 122 and the sensing region 124 respectively correspond to the light-passing region 116 and the light-passing region 118. Moreover, the direction of the second axis A2 of the present embodiment is, for example, a connection line direction of the light-passing region 116 and the light-passing region 118, though the invention is not limited thereto.

According to the above equation (1), since the distance between the object to be positioned 140 and the optical element 110 is $X_0$–0 (i.e. $X_0$), the distance between the object to be positioned 140 and the optical element 110 is proportional to the predetermined distance g. In other words, when the positions of the light-passing regions 116 and 118 and the sensing regions 122 and 124 are fixed, the distance between the object to be positioned 140 and the optical element 110 is increased (decreased) along with increase (decrease) of the predetermined distance g. On the other hand, according to the equation (1), when the positions of the light-passing regions 116 and 118 and the positions of the sensing regions 122 and 124 are fixed and the predetermined distance g is a constant value, the distance (i.e. $X_0$) between the object to be positioned 140 and the optical element 110 is proportional to the distance between the light-passing region 116 and the light-passing region 118. In this way, according to the equation (1), by using the coordinate information $y_{m1}$ and $y_{m2}$ of the light-passing regions 116 and 118 on the second axis A2 and the coordinate information $y_{s1}$ and $y_{s2}$ of the sensing regions 122 and 124 on the second axis A2 based on the received light-sensing signals SLS1 and SLS2, the processing unit 130 is capable of calculating the coordinate $X_0$ related to the distance between the object to be positioned 140 and the optical element 110, i.e. the coordinate $X_0$ of the object to be positioned 140 on the first axis A1 (the x-axis).

Moreover, the coordinate value of the object to be positioned 140 on the second axis A2 (the y-axis) satisfies a following equation:

$$Y_0 = \frac{y_{mi} - y_{si}}{g} \times X_0 + y_{mi} \quad \text{equation (2)}$$

Referring to the above equation (2) and FIG. 1A, $Y_0$ is the coordinate value of the object to be positioned 140 on the second axis A2 (the y-axis), where i is 1 or 2, and the description of $X_0$ can be referred to the equation (1). In one embodiment, according to the coordinate information $y_{m1}$ of the light-passing region 116 on the second axis A2 and the coordinate information $y_{s1}$ of the light-sensing region 122 on the second axis A2, the coordinate $Y_0$ of the object to be positioned 140 on the second axis A2 is $(y_{m0}-y_{s1})X_0/g+y_{m1}$. Alternatively, in another embodiment, according to the coordinate information $y_{m2}$ of the light-passing region 118 on the second axis A2 and the coordinate information $y_{s2}$ of the light-sensing region 124 on the second axis A2, the coordinate $Y_0$ of the object to be positioned 140 on the second axis A2 is $(y_{m2}-y_{s2})X_0/g+y_{m2}$.

According to the equation (2), by using the coordinate information $y_{m1}$ of the light-passing region 116 on the second axis A2 and the coordinate information $y_{s1}$ of the light-sensing region 122 on the second axis A2 (or by using the coordinate information $y_{m2}$ of the light-passing region 118 on the second axis A2 and the coordinate information $y_{s2}$ of the light-sensing region 124 on the second axis A2) as well as the predetermined distance g and the coordinate $X_0$ calculated according to the equation (1), the processing unit 130 is capable of calculating the coordinate $Y_0$ related to the coordinate $X_0$ of the first axis A1, i.e. the coordinate $Y_0$ of the object to be positioned 140 on the second axis A2 (the y-axis).

According to the equations (1) and (2), the processing unit 130 can calculate the coordinates $(X_0, Y_0)$ of the object to be positioned 140. Namely, the position of the object to be positioned 140 in a 2D coordinate system is obtained. Since the optical object positioning apparatus 100 can position an object (for example, the object to be positioned 140) in a 2D operation region constructed by the first axis A1 and the second axis A2, a user can use the optical object positioning apparatus 100 of the invention to detect a touch operation.

Figure 1B:
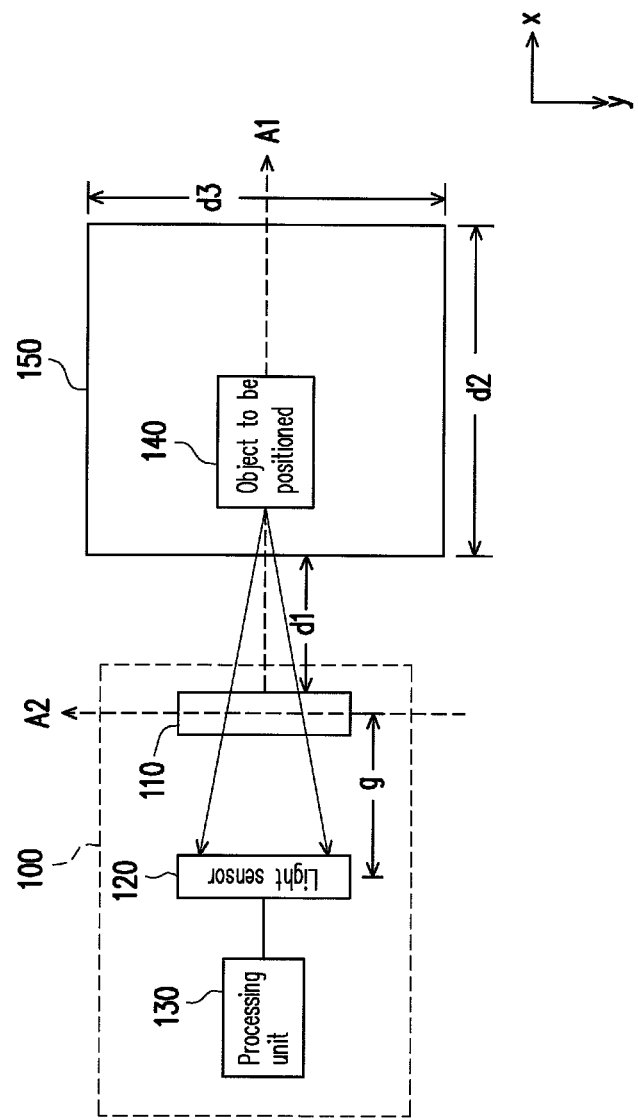
FIG. 1B is a block schematic diagram of an optical object positioning apparatus and an operation region thereof according to an embodiment of the invention.

FIG. 1B is a block schematic diagram of an optical object positioning apparatus and an operation region thereof according to an embodiment of the invention. Referring to FIG. 1B, in one embodiment, the optical object positioning apparatus 100 can exemplarily apply the aforementioned positioning method to position the object to be positioned 140 in an operation region 150. In the present embodiment, the operation region 150 is, for example, parallel to a 2D space constructed by the first axis A1 and the second axis A2, where the operation region 150 and the optical object positioning apparatus 100 are spaced by a distance d1, and the operation region 150 has an area of d2×d3. The distance d1 between the operation region 150 and the optical object positioning apparatus 100 and the area (a product of d2 and d3) of the operation region 150 can be adjusted by a designer or the user according to an actual requirement.

For example, in an embodiment, the distance d1 between the optical element 110 of the optical object positioning apparatus 100 and the operation region 150 can be adjusted by adjusting (for example, increasing or decreasing) a distance between the two light-passing regions 116 and 118 (i.e. $|y_{m1}-y_{m2}|$). In another embodiment, a length of the operation region 150 on the direction of the second axis A2 (i.e. the length d3) can be adjusted by adjusting (for example, increasing or decreasing) the distance d1 between the optical element 110 and the operation region 150 of the optical object positioning apparatus 100 and/or by adjusting a length of the operation region 150 on the direction of the first axis A1 (i.e. the length d2). In some embodiment, a size of the optical object positioning apparatus 100 can be adjusted by adjusting (for example, increasing or decreasing) a distance between the light-passing region 116 and the sensing region 122 on the direction of the second axis A2 (i.e. $|y_{m1}-y_{s1}|$), so as to adjust the length of the operation region 150 on the direction of the second axis A2 (i.e. the length d3). In other embodiments, a thickness of the optical object positioning apparatus 100 can be reduced or increased by adjusting (for example, increasing or decreasing) the predetermined distance g, so as to adjust the distance d1 between the optical element 110 of the optical object positioning apparatus 100 and the operation region 150, the length of the operation region 150 on the direction of the first axis A1 (i.e. the length d2) and/or the length of the operation region 150 on the direction of the second axis A2 (i.e. the length d3).

According to the above description, the predetermined distance g between the optical element 110 and the light sensor 120 can be dynamically adjusted (for example, a motor can be used to dynamically adjust the position of the optical element 110), or the distance $|y_{m1}-y_{s1}|$ between the light-passing region 116 and the sensing region 122 on the direction of the second axis A2 can be dynamically adjusted (for example, the light-passing region of the optical element may have a variable refractive index), so as to adjust the distance d1 between the optical object positioning apparatus 100 and the operation region 150 and the area of the operation region 150 to facilitate setting the operation region 150 according to an actual requirement. Additionally, in an embodiment, a light-passing glass (e.g. a transparent glass) with a thickness of d1 can be added between the optical element 110 and the operation region 150, such that the object to be positioned 140 can lean against/be placed on the light-passing glass to facilitate positioning the optical object positioning apparatus 100. For example, by setting the light-passing glass with the thickness d1 between the optical element 110 and the operation region 150, the user can directly touch the light-passing glass by hand, and the optical object positioning apparatus 100 can position the hand of the user, so as to perform a touch operation. The above implementation related to FIG. 1B is only an example, and the invention is not limited thereto.

Figure 2:
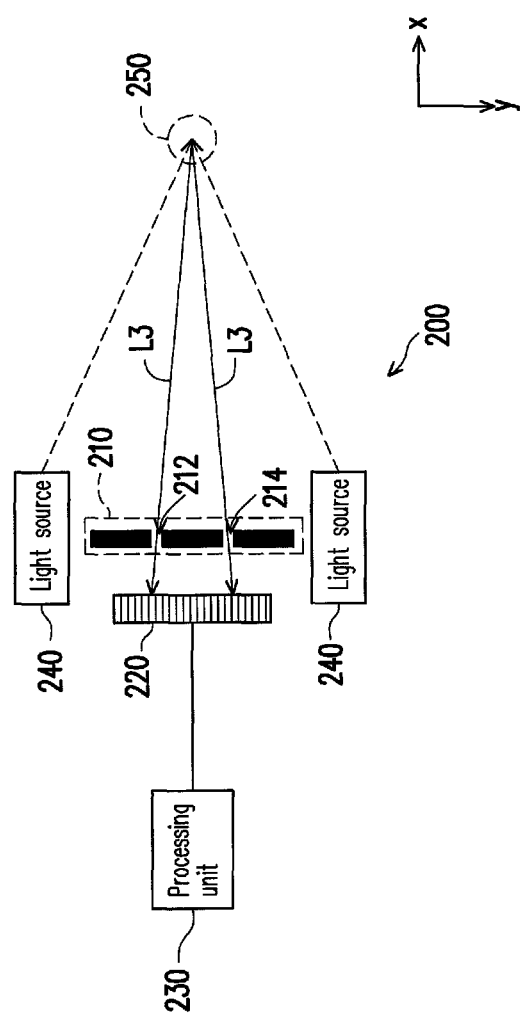
FIG. 2 is a block schematic diagram of an optical object positioning apparatus according to an embodiment of the invention.

In the aforementioned description, the optical element is a hole-like array (e.g. a pinhole array) element which has holes serving as the light-passing regions. However, the invention is not limited thereto. In some embodiments, the optical element can also be a slit array element (i.e. an element having a slit array) having at least two slits. For example, FIG. 2 is a block schematic diagram of an optical object positioning apparatus according to an embodiment of the invention. Referring to FIG. 2, in the present embodiment, the optical object positioning apparatus 200 includes an optical element 210, a light sensor 220, and a processing unit 230. Functions of the above devices are the same or similar to the functions of the corresponding devices in FIG. 1, and details thereof are not repeated.

The optical element 210 of the present embodiment is, for example, a slit array element having at least two slits (for example, slits 212 and 214) serving as the light-passing regions. The optical object positioning apparatus 200 of the present embodiment is, for example, to position an object to be positioned 250 of a non-self-luminous body, so that the optical object positioning apparatus 200 may further include light sources 240. The light sources 240 are used for projecting light to the object to be positioned 250, where positions and the number of the light sources 240 can be adjusted according to an actual design requirement, which are not limited by the invention. In one embodiment, one light source 240 may be enough, and in other embodiment, the number of the light sources 240 is three or more. The invention is not limited to only position the non-self-luminous body. If the optical object positioning apparatus 200 is, for example, to position an object to be positioned 250 of a self-luminous body, the arrangement of the light source 240 may not be necessary. It should be noted that, to simplify the description, the light beams provided by the light sources 240 are schematically illustrated in dot lines, but it does not mean that the light provided by the light sources 240 should have directivity. In the present embodiment, the object to be positioned 250 reflects the light coming from the light sources 240 to form light beams L3, and the light beams L3 can pass through the optical element 210 through the slits 212 and 214 to reach the light sensor 220. The light sensor 220 can sense positions of the light beams L3 to correspondingly provide light-sensing signals to the processing unit 230, and the processing unit 230 can accordingly position the object to be positioned 250.

Figure 3:
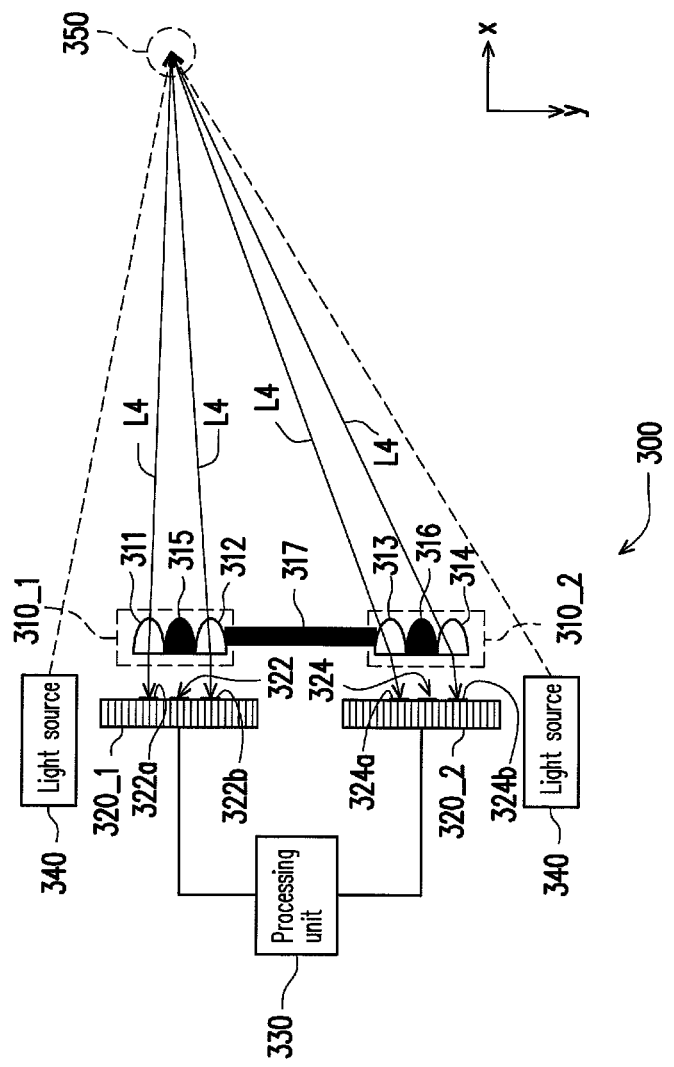
FIG. 3 is a block schematic diagram of an optical object positioning apparatus according to an embodiment of the invention.

In some embodiments, the optical element may have a plurality of light-passing regions of different contours such that the lights passing there through may have a plurality of light patterns. Another embodiment of the optical element implemented by a lens array element having at least two lenses serving as the light-passing regions is described below. FIG. 3 is a block schematic diagram of an optical object positioning apparatus according to an embodiment of the invention. Referring to FIG. 3, in the present embodiment, the optical object positioning apparatus 300 includes optical elements 310_1 and 310_2, light sensors 320_1 and 320_2, and a processing unit 330, where light-passing regions of the optical elements 310_1 and 310_2 can be a spherical lens, an aspherical lens, and/or a zoom lens, though the invention is not limited thereto. In the present embodiment, although two optical elements 310_1 and 310_2 are used for passing light beams and two light sensors 320_1 and 320_2 are used for sensing the light beams, the number of the optical elements and/or the number of the light sensors are not limited by the invention. In other embodiments, one or more than two optical elements and/or light sensors can be used. The optical object positioning apparatus 300 of the present embodiment is, for example, to position an object to be positioned 350 of a non-self-luminous body, so that the optical object positioning apparatus 300 may further include light sources 340. Positions and the number of the light sources 340 can be adjusted according to an actual design requirement, which are not limited by the invention. In other embodiments, one or more than two light sources 340 can be used. The invention is not limited to only position the non-self-luminous body. If the optical object positioning apparatus 300 is, for example, to position an object to be positioned 350 of a self-luminous body, the arrangement of the light sources 340 may not be necessary. It should be noted that, to simplify the description, the light beams provided by the light sources 340 are schematically illustrated in dot lines, but it does not mean that the light provided by the light sources 340 should have directivity. Functions of the above devices are the same or similar to the functions of the corresponding devices in the aforementioned embodiments, and details thereof are not repeated.

Taking lenses 311 and 312 in the optical element 310_1 of the present embodiment as an example, the optical element 310_1 is, for example, a lens array element having at least two lenses (for example, the lenses 311 and 312) serving as the light-passing regions. The object to be positioned 350 reflects the light coming from the light sources 340 to form the light beams L4, and the light beams L4 can pass through the optical element 310_1 through the lenses 311 and 312 to reach the light sensor 320_1. In this way, sensing regions 322a and 322b on the light sensor 320_1 correspondingly produce light-sensing signals. The light-sensing signals are transmitted to the processing unit 330, and the processing unit 330 positions the object to be positioned 350 according to the light-sensing signals. Similarly, the method for positioning the object to be positioned 350 by using the lenses 313 and 314 of the optical element 310_2 and the light sensor 320_2 is deduced.

The optical element 310_1 and/or the optical element 310_2 can be further configured with optical marks, such that the light beams passing through the optical element 310_1 and/or the optical element 310_2 may have a plurality of light patterns, so as to improve accuracy of positioning the object. For example, as shown in FIG. 3, the optical elements 310_1 and 310_2 of the present embodiment respectively include mark elements 315 and 316. The positions of the mark elements 315 and 316 are different to the positions of the lenses 311, 312, 313 and 314 serving as the light-passing regions.

In the present embodiment, the mark elements 315 and 316 are, for example, masks or opaque coatings which can be used for shielding light beams (shielding the light beams coming from the object to be positioned 350), such that the sensing region 322 and the sensing region 324 on the light sensor 320_1 and the light sensor 320_2 corresponding to the mark elements 315 and 316 respectively are all dark regions. In this way, the images sensed by the light sensor 320_1 and the light sensor 320_2 may have special patterns, so as to assist the light sensors 320_1 and 320_2 to accurately sense the light beams L4 coming from the object to be positioned 350 and passing through the lenses 311, 312, 313 and 314.

In other embodiments, the mark elements 315 and 316 can be used to pass light beams. For example, a light-passing pattern (e.g. configuration) of the mark element 315 is different to the light-passing patterns (e.g. configurations) of the light-passing regions 311 and 312 (or a light-passing pattern (e.g. configuration) of the mark element 316 is different to the light-passing patterns of the light-passing regions (e.g. configurations) 313 and 314), and a bright zone presented in the sensing region 322 of the light sensor 320_1 can be different to the bright zones presented in the sensing regions 322a and 322b (or a bright zone presented in the sensing region 324 of the light sensor 320_2 can be different to the bright zones presented in the sensing regions 324a and 324b), such that an image sensed by the light sensor 320_1 (or the light sensor 320_2) may have a special pattern.

In some embodiments, the optical object positioning apparatus 300 may further include a mark element 317, where a position of the mark element 317 is different to the positions of the optical elements 310_1 and 310_2. The mark element 317 is used for shielding lights, or a light-passing pattern (e.g. configuration) thereof is different to the light-passing patterns (e.g. configurations) of the optical elements 310_1 and 310_2.

According to the above description, a sensing error can be decreased by configuring the mark elements 315, 316 and 317, so as to accurately position the object to be positioned 350. Similarly, in the embodiments of FIGS. 1A-1B and FIG. 2, the mark elements can also be configured to enhance accuracy of positioning the object, and details thereof are not repeated. Moreover, the light-passing pattern (light-shielding pattern) of the mark element is not limited by the invention. For example, a cross pattern, a flower pattern, a spacing line pattern, or other suitable patterns can be used as the light-passing pattern (the light-shielding pattern). Any light-passing pattern (light-shielding pattern) different to the light-passing region of the optical element is within the scope of the invention.

In the embodiment in FIGS. 2-3, the predetermined distances between the optical elements (210, 310_1, 310_2) and the light sensors (220, 320_1, 320_2) can be dynamically adjusted (for example, motors are used to dynamically adjust the positions of the optical element 210, 310_1 and 310_2), or the distance between the light-passing region and the sensing region on the direction of the second axis A2 can be dynamically adjusted (for example, the light-passing region of the optical element may have a variable refractive index), so as to adjust the distances between the optical object positioning apparatuses (200, 300) and the operation region (not shown) and the area of the operation regions. The lenses 311, 312 (313, 314) in the optical element 310_1 (310_2) can be lenses with a variable refractive index, such as zoom lenses, liquid crystal lenses, electro-wetting lenses, or other lenses with a suitable variable refractive index.

Referring to FIGS. 1A-1B and FIG. 3, in other embodiments, when the number of the light-passing regions (for example, the light-passing regions 116 and 118) is 2, the optical object positioning apparatuses 100, 200 and 300 in FIGS. 1A-1B and FIG. 3 can respectively obtain positions of the objects to be positioned 140, 250 and 350 in a 3D coordinate system. As shown in FIG. 1A, it is assumed that the light-passing region 116 and the light-passing region 118 are located in a 2D space constructed by the second axis A2 (the y-axis) and a third axis (for example, a z-axis). The first axis A1 (the x-axis), the second axis A2 (the y-axis), and the third axis (the z-axis) are perpendicular to each other, and it is assumed that the coordinate value of the first surface 112 of the optical element 110 on the first axis A1 (the x-axis) is 0. A coordinate value of the object to be positioned 140 on the third axis (the z-axis) satisfies the following equation:

$$Z_0 = \frac{z_{mi} - z_{si}}{g} \times X_0 + z_{mi} \qquad \text{equation (3)}$$

Referring to the equation (3) and FIG. 1A, $Z_0$ is the coordinate value of the object to be positioned 140 on the third axis (the z-axis), where i is 1 or 2, and the description of $X_0$ can be referred to the equation (1). $z_{mi}$ represents a coordinate of the light-passing region on the third axis (the z-axis). For example, $z_{m1}$ and $z_{m2}$ respectively represent coordinates of the light-passing region 116 and the light-passing region 118 on the third axis (the z-axis). $z_{si}$ represents a coordinate of the sensing region corresponding to the light-sensing signal on the direction of the third axis (the z-axis). For example, $z_{s1}$ and $z_{s2}$ respectively represent coordinates of the sensing regions 122 and 124 corresponding to the light-sensing signals SLS1 and SLS2 respectively on the direction of the third axis (the z-axis) (i.e. coordinate information of the light-sensing signals SLS1 and SLS2 related to the third axis), where the sensing region 122 and the sensing region 124 respectively correspond to the light-passing region 116 and the light-passing region 118. In an embodiment, according to the coordinate information $z_{m1}$ of the light-passing region 116 on the third axis (the z-axis) and the coordinate information $z_{s1}$ of the sensing region 122 on the third axis (the z-axis), the coordinate $Z_0$ of the object to be positioned 140 on the third axis (the z-axis) is $(z_{m1}-z_{s1}) X_0/g+z_{m1}$. Alternatively, in another embodiment, according to the coordinate information $z_{m2}$ of the light-passing region 118 on the third axis (the z-axis) and the coordinate information $z_{s2}$ of the sensing region 124 on the third axis (the z-axis), the coordinate $Z_0$ of the object to be positioned 140 on the third axis (the z-axis) is $(z_{m2}-z_{s2})X_0/g+z_{m2}$. In this way, the coordinate $Z_0$ correlated to the coordinate $X_0$ of the first axis A1 (the x-axis) is obtained, i.e. the coordinate $Z_0$ of the object to be positioned 140 on the third axis (the z-axis) is obtained.

According to the above description, and referring to the equations (1), (2), (3) and FIG. 1A, the processing unit 130 can calculate the coordinates $(X_0, Y_0, Z_0)$ of the object to be positioned 140 through the equation (1), the equation (2), and the equation (3). Namely, the position of the object to be positioned 140 in the 3D coordinate system can be obtained.

In other embodiments, the coordinate value $X_0$ of the object to be positioned 140 on the first axis A1 (the x-axis) also satisfies the following equation (4):

$$X_0 = \frac{g \times |z_{m1} - z_{m2}|}{|z_{s1} - z_{s2}| - |z_{m1} - z_{m2}|} \qquad \text{equation (4)}$$

The parameters g, $z_{m1}$, $z_{m2}$, $z_{s1}$ and $z_{s2}$ in the equation (4) have been described in the aforementioned embodiments, and details thereof are not repeated.

Referring to FIG. 1B, similar to the abovementioned description of the embodiment of FIG. 1B, in the present embodiment, the predetermined distance between the optical element 110 and the light sensor 120 can be dynamically adjusted (for example, a motor is used to dynamically adjust the position of the optical element 110), or the distance $|z_{m1}-z_{s1}|$ between the light-passing region 116 and the sensing region 122 on the direction of the third axis (the z-axis) can be dynamically adjusted (for example, the light-passing region of the optical element may have a variable refractive index), so as to adjust the distance d1 between the optical object positioning apparatus 100 and the operation region (not shown) and the area of the 3D operation region for positioning the object to be positioned 140 in the 3D operation region. For example, when the user's hand operates in the 3D operation region, the optical object positioning apparatus 100 can position the user's hand to perform an air touch or gesture operation.

Figure 4:
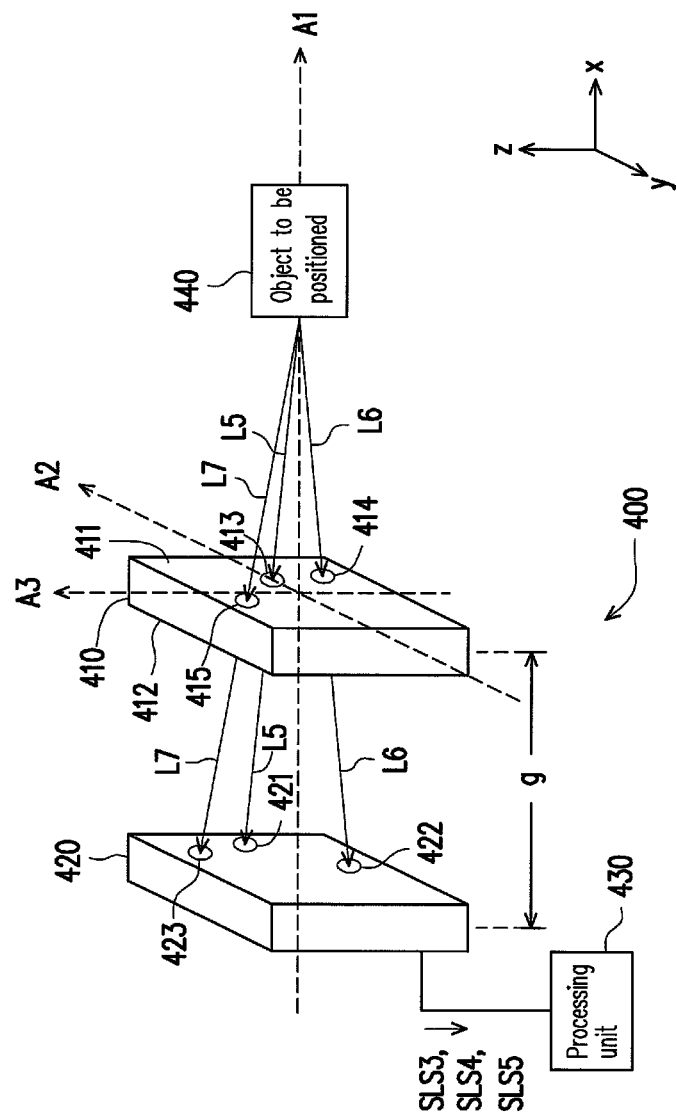
FIG. 4 is a block schematic diagram of an optical object positioning apparatus according to an embodiment of the invention.

In other embodiments, the optical object positioning apparatus can also position an object to be positioned in the 3D space according to the embodiment of FIG. 4. FIG. 4 is a block schematic diagram of an optical object positioning apparatus according to an embodiment of the invention. Referring to FIG. 4, in the present embodiment, the optical object positioning apparatus 400 includes an optical element 410, a light sensor 420, and a processing unit 430. The optical element 410 of the present embodiment has at least three light-passing regions, where the optical element 410 is, for example, a hole-like array element having at least three holes serving as the light-passing regions. The structure of the light-passing region is not limited by the invention, and in other embodiments, the at least three light-passing regions in the optical element 410 can also be formed by slits, lenses or other suitable optical structures.

As shown in FIG. 4, the optical element 410 includes a first surface 411 and a second surface 412 opposite to each other and perpendicular to the first axis A1, and has at least three light-passing regions (for example, light-passing regions 413, 414 and 415). Light beams L5, L6 and L7 coming from the object to be positioned 440 (for example, a fingerprint, a stylus, or a mouse) respectively pass through the light-passing regions 413, 414 and 415 from the first surface 411 to the second surface 412. The light sensor 420 and the optical element 410 are spaced by the predetermined distance g along the direction of the first axis A1. According to positions on the light sensor 420 that are irradiated by the light beams L5, L6 and L7 respectively passing through the light-passing regions 413, 414 and 415 (i.e. sensing regions 421, 422 and 423 in FIG. 4), the light sensor 420 can correspondingly generate three light-sensing signals (for example, the light-sensing signals SLS3, SLS4, and SLS5). The processing unit 430 receives the light-sensing signals SLS3, SLS4 and SLS5, and positions the object to be positioned 440 according to the positions of the sensing regions corresponding to the light-sensing signals SLS3, SLS4 and SLS5, the positions of the light-passing regions 413, 414 and 415, and the predetermined distance g.

The method that the optical object positioning apparatus 400 of the present embodiment positions the object to be positioned 440 in the 3D space is described below in detail with reference of FIG. 4. In the present embodiment, when the number of the light-passing regions (for example, the light-passing regions 413, 414 and 415) is greater than or equal to 3 and the light-passing regions are not arranged on a straight line, the processing unit 430 can calculate the 3D coordinates of the object to be positioned 440 in the 3D space according to the positions of the sensing regions 421, 422 and 423 represented by the light-sensing signals SLS3, SLS4 and SLS5 and the predetermined distance g. As shown in FIG. 4, in the 3D space constructed by the first axis A1, the second axis A2, and the third axis A3 perpendicular to each other, it is assumed that the coordinate value of the first surface 411 of the optical element 410 on the first axis A1 is 0. The coordinate value of the object to be positioned 440 on the first axis A1 satisfies the following equation (5):

$$X_0 = \frac{g \times |y_{mi} - y_{mj}|}{|y_{si} - y_{sj}| - |y_{mi} - y_{mj}|} \qquad \text{equation (5)}$$

Referring to the above equation (5) and FIG. 4, $X_0$ is the coordinate value of the object to be positioned 440 on the first axis A1 (the x-axis), where i is 1, 2 or 3, j is 1, 2 or 3, and i is not equal to j. $y_{mi}$ and $y_{mj}$ present coordinates of any two of the light-passing regions 413, 414 and 415 on the second axis A2 (the y-axis), $y_{si}$ and $y_{sj}$ represent coordinates of sensing regions corresponding to any two of the light-sensing signals SLS3, SLS4 and SLS5 on the second axis A2 (the y-axis) (i.e. the coordinate information of any two of the light-sensing signals SLS3, SLS4 and SLS5 related to the second axis A2).

The coordinate value of the object to be positioned 440 on the second axis A2 (the y-axis) satisfies the equation (2):

$$Y_0 = \frac{y_{mi} - y_{si}}{g} \times X_0 + y_{mi} \qquad \text{equation (2)}$$

Based on the equation (2), according to the coordinates $(y_{m1}, z_{m1})$ of the light-passing region 413 and the coordinates $(y_{s1}, z_{s1})$ of the sensing region 421, the coordinate $Y_0$ of the object to be positioned 440 on the second axis A2 is $(y_{m1}-y_{s1})X_0/g+y_{m1}$. Alternatively, in another embodiment, according to the coordinates $(y_{m2}, z_{m2})$ of the light-passing region 414 and the coordinates $(y_{s2}, z_{s2})$ of the sensing region 422, the coordinate $Y_0$ of the object to be positioned 440 on the second axis A2 is $(y_{m2}-y_{s2})X_0/g+y_{m2}$. Alternatively, in other embodiments, according to the coordinates $(y_{m3}, z_{m3})$ of the light-passing region 415 and the coordinates $(y_{s3}, z_{s3})$ of the sensing region 423, the coordinate $Y_0$ of the object to be positioned 440 on the second axis A2 is $(y_{m3}-y_{s3})X_0/g+y_{m3}$.

The coordinate value of the object to be positioned 440 on the third axis A3 (the z-axis) satisfies the equation (3):

$$Z_0 = \frac{z_{mi} - z_{si}}{g} \times X_0 + z_{mi} \qquad \text{equation (3)}$$

Based on the equation (3), according to the coordinates $(y_{m1}, z_{m1})$ of the light-passing region 413 and the coordinates $(y_{s1}, z_{s1})$ of the sensing region 421, the coordinate $Z_0$ of the object to be positioned 440 on the third axis A3 is $(z_{m1}-z_{s1})X_0/g+z_{m1}$. Alternatively, in another embodiment, according to the coordinates $(y_{m2}, z_{m2})$ of the light-passing region 414 and the coordinates $(y_{s2}, z_{s2})$ of the sensing region 422, the coordinate $Z_0$ of the object to be positioned 440 on the third axis A3 is $(z_{m2}-z_{s2})X_0/g+z_{m2}$. Alternatively, in other embodiments, according to the coordinates $(y_{m3}, z_{m3})$ of the light-passing region 415 and the coordinates $(y_{s3}, z_{s3})$ of the sensing region 423, the coordinate $Z_0$ of the object to be positioned 440 on the third axis A3 is $(z_{m3}-z_{s3})X_0/g+z_{m3}$.

According to the above description, and referring to the equations (5), (2) and (3), the processing unit 430 can calculate the coordinates $(X_0, Y_0, Z_0)$ of the object to be positioned 440. Namely, the position of the object to be positioned 440 in the 3D coordinate system can be obtained. Although the light-passing regions 413, 414 and 415 exemplarily illustrated in the above embodiment are not arranged on a straight line, the invention is not limited thereto. In other embodiments, the position of the object to be positioned 440 in the 3D coordinate system can also be obtained if number of the light-passing regions is greater than or equal to 3 and the light-passing regions are arranged on a straight line.

Since the optical object positioning apparatus 400 can position the object (for example, the object to be positioned 440), the user can use the optical object positioning apparatus 400 of the present embodiment to perform a touch operation, an air touch/a floating touch, or a gesture operation, etc.

Figure 5:
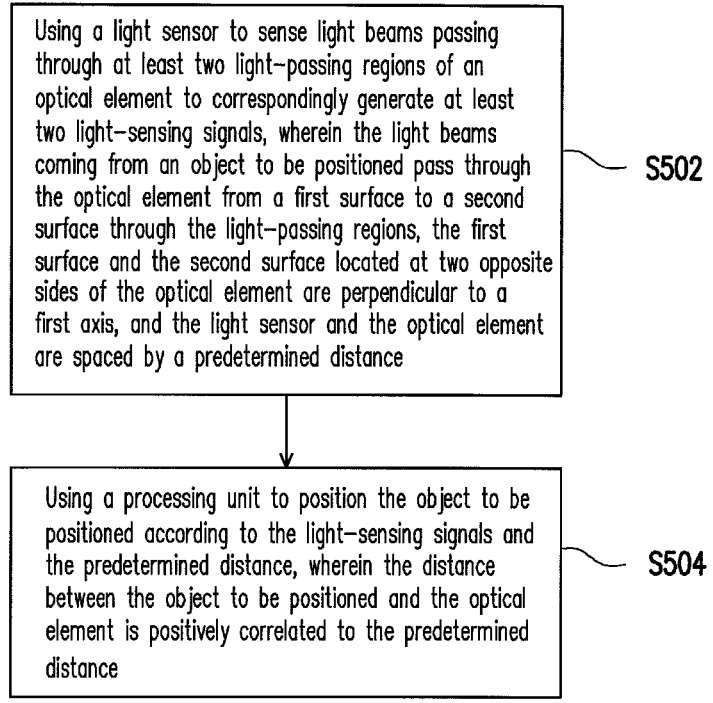
FIG. 5 is a flowchart illustrating an optical object positioning method according to an embodiment of the invention.

An embodiment of the invention provides an optical object positioning method, which is adapted to the optical object positioning apparatuses 100, 200, 300, and 400 of the aforementioned embodiment. FIG. 5 is a flowchart illustrating an optical object positioning method according to an embodiment of the invention. Steps of the optical object positioning method of the present embodiment are described below with reference of FIG. 5 and the optical object positioning apparatus 100 of FIG. 1.

Referring to FIG. 1 and FIG. 5, in step S502, the light sensor 120 is used to sense light beams passing through at least two light-passing regions (for example, the light-passing regions 116 and 118) of the optical element 110, so as to correspondingly generate at least two light-sensing signals (for example, the light-sensing signals SLS1 and SLS2). The light beams coming from the object to be positioned 140 pass through the optical element 110 from the first surface 112 to the second surface 114 through the light-passing regions 116 and 118. The first surface 112 and the second surface 114 located at the two opposite sides of the optical element 110 are perpendicular to the first axis A1, and the light sensor 120 and the optical element 110 are spaced by the predetermined distance g.

In step S504, the processing unit 130 is used to position the object to be positioned 140 according to the light-sensing signals SLS1, SLS2 and the predetermined distance g. The distance between the object to be positioned 140 and the optical element 110 is positively correlated to the predetermined distance g. Details of the above steps S502 and S504 may refer to the embodiments of FIGS. 1A-1B, FIG. 2 to FIG. 4, which are not repeated.

In the embodiment of the optical object positioning method of the present invention, after the object to be positioned 140 is positioned after coordinates thereof are calculated (after the step S504), a calibration step can be further executed according to an actual requirement to calibrate the calculated coordinates, so as to improve accuracy thereof.

In the embodiments of the optical object positioning apparatus and the optical object positioning method of the invention, equations are obtained by using at least two light-passing regions of the optical element, two corresponding light-sensing signals (information) generated by the light sensor, and the distance (the predetermined distance) between the light sensor and the optical element to calculate the coordinates of an object (an operation point) on an operation region in a 2D or 3D space to position the object. The method of the invention can replace a general image processing method performed on a captured image, so as to avoid complicated image processing that would delay an operation, and improve efficiency of object positioning. Moreover, the optical object positioning apparatus and the positioning method thereof can accurately calculate a positioning point to improve accuracy of positioning.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art after reading the disclosure. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical object positioning apparatus, comprising:
an optical element, comprising a first surface and a second surface opposite to each other and perpendicular to a first axis, having at least two light-passing regions, wherein the at least two light-passing regions are capable of letting light beams coming from an object to be positioned pass through from the first surface to the second surface;
a light sensor, spaced by a predetermined distance from the optical element on a direction of the first axis, configured to sense the light beams coming from the light-passing regions to correspondingly generate at least two light-sensing signals, wherein the distance between the object to be positioned and the optical element on the direction of the first axis is positively correlated to the predetermined distance; and
a processing unit, coupled to the light sensor, configured to receive the light-sensing signals and position the object to be positioned according to the light-sensing signals and the predetermined distance,
wherein when a coordinate value of the first surface of the optical element on the first axis is 0, a coordinate value of the object to be positioned on the first axis satisfies:

$$X_0 = \frac{g \times |y_{m1} - y_{m2}|}{|y_{s1} - y_{s2}| - |y_{m1} - y_{m2}|},$$

wherein $X_0$ is the coordinate value of the object to be positioned on the first axis, g is the predetermined distance, $y_{m1}$ and $y_{m2}$ are respectively coordinate values of any two of the light-passing regions on a second axis, $y_{s1}$ and $y_{s2}$ are respectively coordinate information of the light-sensing signals corresponding to the any two of the light-passing regions that is related to the second axis, and the second axis is perpendicular to the first axis.

2. The optical object positioning apparatus as claimed in claim 1, wherein the processing unit is configured to calculate two-dimensional coordinates of the object to be positioned in a two-dimensional space according to the light-sensing signals and the predetermined distance, wherein a coordinate value of the two-dimensional coordinates on the direction of the first axis is correlated to the predetermined distance and a distance between any two of the light-passing regions, a coordinate value of the two-dimensional coordinates on a direction of a second axis is correlated to the coordinate value on the direction of the first axis, and wherein the second axis is perpendicular to the first axis.

3. The optical object positioning apparatus as claimed in claim 1, wherein the processing unit is configured to calculate three-dimensional coordinates of the object to be positioned in a three-dimensional space according to the light-sensing signals and the predetermined distance, wherein a coordinate value of the three-dimensional coordinates on the direction of the first axis is correlated to the predetermined distance and a distance between any two of the light-passing regions, a coordinate value of the three-dimensional coordinates on a direction of a second axis is correlated to the coordinate value on the direction of the first axis, and a coordinate value of the three-dimensional coordinates on a direction of a third axis is correlated to the coordinate value on the direction of the first axis, and wherein the first axis, the second axis and the third axis are perpendicular to each other, and the light-passing regions are located on a plane formed by the second axis and the third axis.

4. The optical object positioning apparatus as claimed in claim 1, wherein a coordinate value of the object to be positioned on the second axis satisfies:

$$Y_0 = \frac{y_{mi} - y_{si}}{g} \times X_0 + y_{mi},$$

wherein $Y_0$ is the coordinate value of the object to be positioned on the second axis, and i is 1 or 2.

5. The optical object positioning apparatus as claimed in claim 1, wherein a coordinate value of the object to be positioned on a third axis satisfies:

$$Z_0 = \frac{z_{mi} - z_{si}}{g} \times X_0 + z_{mi},$$

wherein $Z_0$ is the coordinate value of the object to be positioned on the third axis, $z_{mi}$ is a coordinate value of one of the light-passing regions on the third axis, $z_{si}$ is coordinate information of one of the light-sensing signals corresponding to the one of the light-passing regions that is related to the third axis, i is 1 or 2, and the third axis is perpendicular to the first axis and the second axis.

6. The optical object positioning apparatus as claimed in claim 1, wherein the optical element comprises a slit array element having at least two slits, a hole-like array element having at least two holes, or a lens array element having at least two lenses.

7. The optical object positioning apparatus as claimed in claim 6, wherein the optical element comprises the lens array element having at least two lenses, and the lens comprises at least one of an aspherical lens, a spherical lens, and a zoom lens.

8. The optical object positioning apparatus as claimed in claim 1, wherein the optical element further comprises at least one mark element, and a position of the at least one mark element is different to positions of the light-passing regions.

9. The optical object positioning apparatus as claimed in claim 8, wherein the at least one mark element is configured to shield light or has a light-passing pattern different to light-passing patterns of the light-passing regions.

10. The optical object positioning apparatus as claimed in claim 1, further comprising:
a light source, configured to project light to the object to be positioned.

11. The optical object positioning apparatus as claimed in claim 1, wherein the processing unit is configured to receive the light-sensing signals and position the object to be positioned according to the predetermined distance, coordinates of any two of the light-passing regions, and coordinates of two sensing regions on the light sensor respectively corresponding to the any two of the light-passing regions, and wherein the at least two light-sensing signals are respectively corresponding to the two sensing regions and the two sensing regions are positions of the at least two light beams reaching the light sensor after the at least two light beams pass through the any two of the light-passing regions.

12. An optical object positioning method, comprising:
using a light sensor to sense light beams passing through at least two light-passing regions of an optical element to correspondingly generate at least two light-sensing signals, wherein the light beams coming from an object to be positioned pass through the optical element from a first surface to a second surface through the light-passing regions, the first surface and the second surface located at two opposite sides of the optical element are perpendicular to a first axis, and the light sensor and the optical element are spaced by a predetermined distance; and
using a processing unit to position the object to be positioned according to the light-sensing signals and the predetermined distance, wherein the distance between the object to be positioned and the optical element is positively correlated to the predetermined distance,
wherein when a coordinate value of the first surface of the optical element on the first axis is 0, a coordinate value of the object to be positioned on the first axis satisfies:

$$X_0 = \frac{g \times |y_{m1} - y_{m2}|}{|y_{s1} - y_{s2}| - |y_{m1} - y_{m2}|},$$

wherein $X_0$ is the coordinate value of the object to be positioned on the first axis, g is the predetermined distance, $y_{m1}$ and $y_{m2}$ are respectively coordinate values of any two of the light-passing regions on a second axis, $y_{s1}$ and $y_{s2}$ are respectively coordinate information of the light-sensing signals corresponding to the any two of the light-passing regions that is related to the second axis, and the second axis is perpendicular to the first axis.

13. The optical object positioning method as claimed in claim 12, wherein the step of positioning the object to be positioned further comprises:
calculating two-dimensional coordinates of the object to be positioned in a two-dimensional space according to the light-sensing signals and the predetermined distance, wherein a coordinate value of the two-dimensional coordinates on a direction of the first axis is correlated to the predetermined distance and a distance between any two of the light-passing regions, and a coordinate value of the two-dimensional coordinates on a direction of a second axis is correlated to the coordinate value on the direction of the first axis, wherein the second axis is perpendicular to the first axis.

14. The optical object positioning method as claimed in claim 12, wherein the step of positioning the object to be positioned further comprises:
calculate three-dimensional coordinates of the object to be positioned in a three-dimensional space according to the light-sensing signals and the predetermined distance, wherein a coordinate value of the three-dimensional coordinates on the direction of the first axis is correlated to the predetermined distance and a distance between any two of the light-passing regions, a coordinate value of the three-dimensional coordinates on a direction of a second axis is correlated to the coordinate value on the direction of the first axis, and a coordinate value of the three-dimensional coordinates on a direction of a third axis is correlated to the coordinate value on the direction of the first axis, wherein the first axis, the second axis, and the third axis are perpendicular to each other, and the light-passing regions are located on a plane formed by the second axis and the third axis.

15. The optical object positioning method as claimed in claim 13, wherein a coordinate value of the object to be positioned on the second axis satisfies:

$$Y_0 = \frac{y_{mi} - y_{si}}{g} \times X_0 + y_{mi},$$

wherein $Y_0$ is the coordinate value of the object to be positioned on the second axis, and i is 1 or 2.

16. The optical object positioning method as claimed in claim 12, wherein a coordinate value of the object to be positioned on a third axis satisfies:

$$Z_0 = \frac{z_{mi} - z_{si}}{g} \times X_0 + z_{mi},$$

wherein $Z_0$ is the coordinate value of the object to be positioned on the third axis, $z_{mi}$ is a coordinate value of one of the light-passing regions on the third axis, $z_{si}$ is coordinate information of one of the light-sensing signals corresponding to the one of the light-passing regions that is related to the third axis, i is 1 or 2, and the third axis is perpendicular to the first axis and the second axis.

* * * * *